June 26, 1923.

R. BOLLHEIMER ET AL
WHEELED GRADER
Filed July 10, 1922

Inventors
Rhinehard Bollheimer
Edward T. Wilkens
By William R. Pratt
Attorney

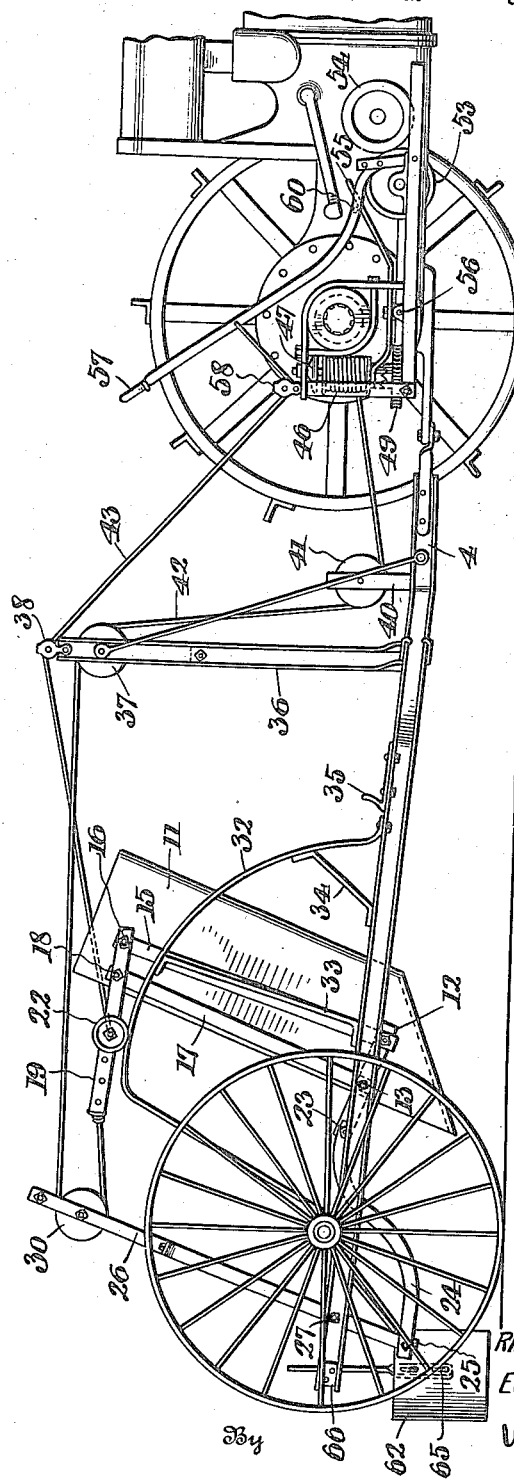

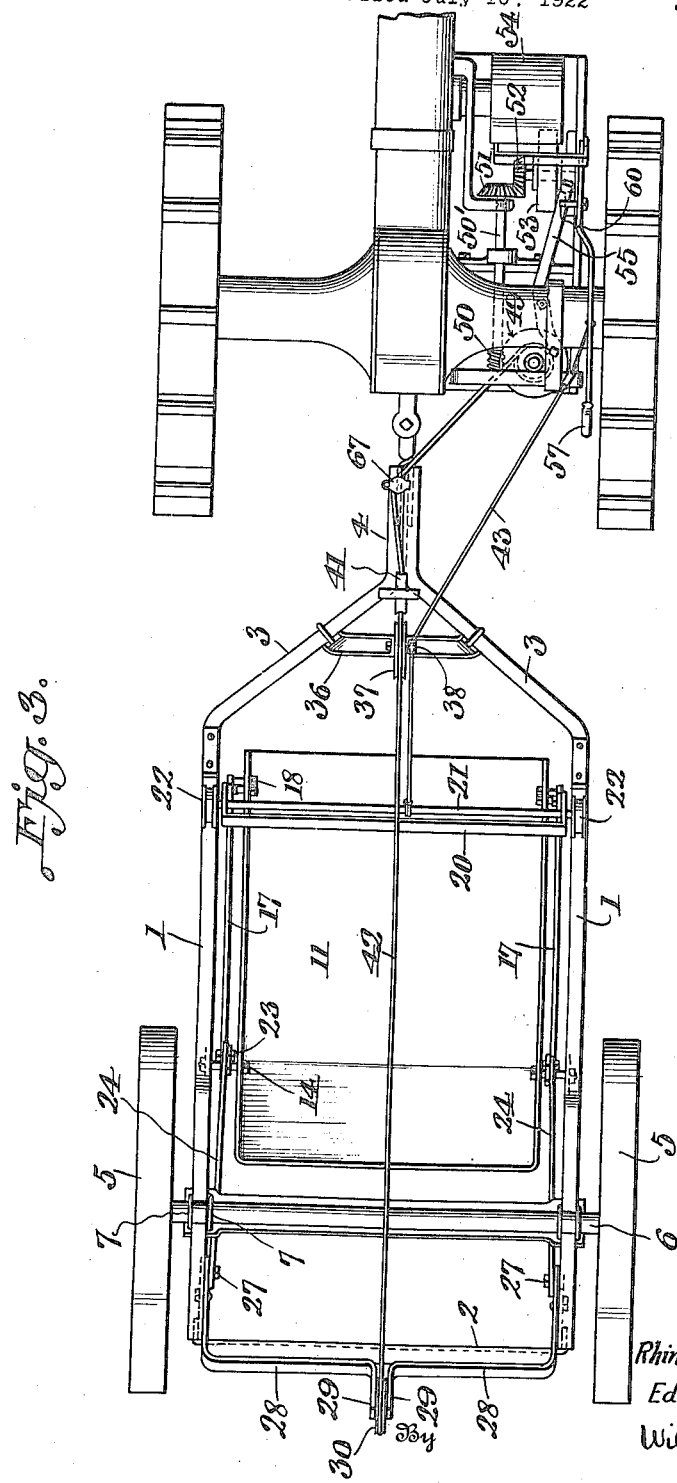

UNITED STATES PATENT OFFICE.

RHINEHARD BOLLHEIMER AND EDWARD T. WILKENS, OF FORT LORAMIE, OHIO.

WHEELED GRADER.

Application filed July 10, 1922. Serial No. 574,046.

*To all whom it may concern:*

Be it known that we, RHINEHARD BOLLHEIMER and EDWARD T. WILKENS, citizens of the United States, residing at Fort Loramie, in the county of Shelby and State of Ohio, have invented certain new and useful Improvements in Wheeled Graders, of which the following is a specification.

Our invention relates to a wheeled grader or scraper which is particularly adapted to be drawn by a tractor and controlled therefrom, although in many features it is not limited to a tractor drawn mechanism.

An object of our invention is to provide a device of this character which can be readily and quickly attached to a tractor or detached therefrom, and the dumping operation of which may be controlled from the tractor.

Another object is to provide a wheeled scraper having a scoop that can be quickly dumped whenever desired, or which can be raised clear of the ground and used to transport the material any desired distance before dumping.

Another object is to provide means for moving the scraper to dumping position which will be simple and strong in construction and efficient in operation.

Further objects will be apparent from the following detailed description and appended claims.

In the drawings:—

Figure 1 is a side view of the device with a portion of the tractor to which it is attached with the scraper in lowered position.

Figure 1ª is a section on line *a—a* of Figure 1.

Figure 2 is a similar view with the scraper in dumping position.

Figure 3 is a top plan view, with parts omitted.

Figure 1A:
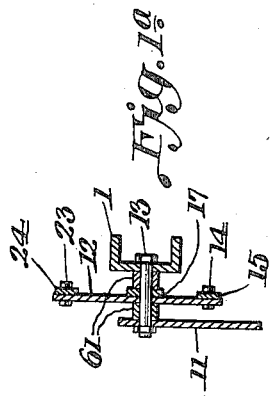

The main frame of the scraper or grader is composed of longitudinal channel irons 1 connected by a rear bar 2 and having their front ends inwardly directed as at 3 and finally lying adjacent each other at 4 where they may be secured together by bolts or any desired fastening means. Wheels 5 turn on an axle 6 and the side frames 1 are supported from this axle by means of U-bolts 7 in a common and well known manner. The front end of the members 4 have a bar 8 bolted or otherwise attached thereto which is adapted to be connected by a detachable fastening 9 to a part 10 of the tractor.

The scoop 11 may be made of any desired material, preferably pressed steel, and is of the shape illustrated, the front end being open and the rear end slanted from the bottom upwardly and rearwardly to enable easier dumping of material therefrom. Pivoted to each frame bar 1 at 13 is a short lever 12 the lower end of which is bolted to the scoop at 14 and to a bar 15 fastened to the front end of the scoop at 16. Another bar 17 is attached to the lever 12 on the pivot 13, or it may be made integral with the lever 12, the two then forming a T-shaped member. This lever is also bolted to the scoop at 18. Fastened to the scoop by the same bolts 16 and 18 are uprights 19 connected at their top by a cross bar 20 (see Figure 3). Mounted in the uprights 19 is a shaft 21 carrying a roller 22 at each end, the purpose of which will be hereinafter set forth.

Fastened to the upper end of each lever 12 by a pivot 23 is a link 24 which extends rearwardly and is pivotally connected at its rear end at 25 to a lever 26 which is pivoted at 27 to the side bar 1. When the scoop is in its lowered position these levers extend upwardly and rearwardly as shown and have inwardly directed portions 28 which terminate in parallel arms 29 having a pulley 30 carried therebetween on a pivot 31 which also acts to connect the arms 29.

At each side a curved track member 32 of the shape shown is attached at its ends to the side frame 1, and is further supported by braces 33 and 34 attached to the track member and the side bar. These track members are of such shape that the rollers 22 will run thereon during the pivotal movement of the scoop when it is dumped.

Curved stop members 35 as shown limit the movement of the rollers 22 on their return to normal position. Standards 36 are attached to the portions 3 of the frame in any desired manner and are inclined toward each other until they meet, after which they are extended in parallelism and fastened together. A pulley 37 is supported by these standards, and a smaller pulley 38 is carried at their tops. Brace rods 39 have their lower ends fastened to the part 4 of the frame and their upper ends attached to the standards 36 by the pivot of the pulley 37. A short standard 40 attached to the front part of the frame portion 3 carries a pulley 41. A cable 42 is fastened to the middle of the bar 20, passes rearwardly, then up and over pulley 30, forwardly over pulley 37 and under pulley 41 to a winding drum hereinafter described. A second cable 43 is attached near the middle of the shaft 21 and passes up over the pulley 38 and down to mechanism on tractor hereinafter described. When the scoop is loaded and it is desired to dump the same, a pull on the cable 42 will swing the levers 26 forwardly about their pivots 27 rocking the links 24 and turning the levers 12 about their pivots 13 to rotate the scoop and thus lift its forward end. At the same time the pull of the cable acts through its connection with the bar 20 to lift the front end of the scoop through the uprights 19. The combination of the two movements swings the scoop about the pivots 13 and causes the rollers 22 to ride up on the tracks 32 from the position shown in Figure 1 to that shown in Figure 2.

So far as this action is concerned it is immaterial how the pull is applied to the cable 42, but we have illustrated the following mechanism as located on the tractor A, only a part of which is shown. This tractor may be of any desired type and the mechanism will be modified in details for the purpose of installation in varying locations. As illustrated, a frame 44 is supported on the tractor by means including strap irons 45 which engage around the axle, and in this frame is mounted a vertical drum 46 on which the cable 42 is wound. At the upper end a fixed flange 47 acts as a brake against the flange of the drum when the drum, which is slidably mounted on its shaft, is raised. Near the lower side a clutch 48 is provided, one member of the clutch being on the drum and slidable therewith, while the other is rigid with a worm wheel 49 which meshes with a worm 50 on one end of a shaft 50' which carries a gear 51 at its other end. This gear meshes with a gear 52 on a short shaft carrying a friction gear 53 engaging a larger friction gear 54 driven by the engine of the tractor.

The clutch may be operated by a foot pedal 55 pivoted to turn in two planes at 56 and having a fork engaging one member of the clutch in the usual manner. When the drum is raised to disconnect the clutch members, the brake 47 comes into operation and holds the drum from unwinding. The clutch may also be automatically operated by a lever 57 to which the cable 43 is attached after passing under a pulley 58. As the shaft 21, to which the other end of the cable is attached, moves rearwardly to the Figure 2 position as the scoop is dumped, it reaches a point where it will exert a pull on the lever 57 and rock it about its pivot 59, causing a pin or arm 60 on the lever to engage the pedal 55 and rock the same. This will automatically disconnect the clutch. The scoop may be returned from the Figure 2 to the Figure 1 position by means of the lever 57 which will start the movement, and the rollers 22 will then roll down the tracks 32 under the force of gravity. At this time, either the engine must be stopped, or the clutch must be broken by a depression of the pedal 55 in order that the cable 42 may be free to unwind from the drum 46.

Figure 1:
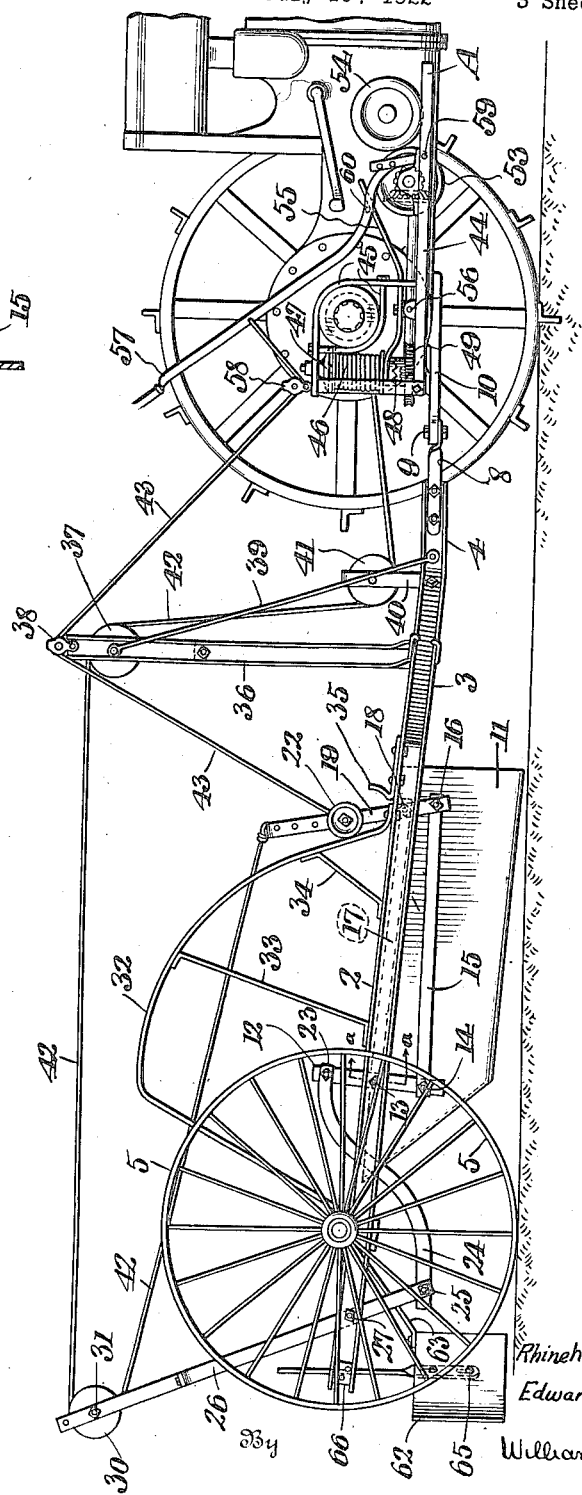

Figure 1ᵃ shows how the various pivot bolts of the machine are mounted with bushings 61 between the engaging parts.

A V-shaped scraper 62 having its apex forwardly directed, is supported at the rear of the frame by braces 63 and supports 64. These may be adjustably attached at 65 to the scraper or adjustably carried at 66 between engaging clamp members.

The cable 42 may be carried directly from the pulley 41 to the drum 46 as shown in Figures 1 and 2, or it may pass around a directing sheave 67 as shown in Figure 3.

It is obvious that many of the details of the device may be changed without departing from the spirit of the invention and the specific embodiment shown is intended as illustrative rather than as limiting the invention, which in general is to be regarded as limited only by the scope of the appended claims.

We claim as our invention:

1. A road grader comprising a wheeled frame, a scoop, levers attached intermediate their ends to the frame and at their lower ends fastened to the rear portion of the scoop, links connected at one end to the upper ends of the levers and at the other end to a pair of operating levers pivoted to the frame, uprights attached to the front end of the scoop, rollers carried thereby, tracks on which said rollers may run, and a single cable communicating movement to the operating levers and the roller carrying uprights to move them toward each other and thereby dump the scoop.

2. A road grader comprising a wheeled frame, a scoop, levers attached intermediate their ends to the frame and at their lower ends fastened to the rear portion of the scoop, links connected at one end to the upper ends of the levers and at the other end to a pair of operating levers which carry a pulley at their upper ends, uprights attached to the front end of the scoop, a bar connecting their upper ends, rollers carried by the uprights, tracks upon which the rollers run, and a cable attached at one end to said bar and passing around said pulley to communicate motion to the operating levers and uprights, thereby moving them toward each other and dumping the scoop.

3. A road grader comprising a wheeled frame, a scoop pivotally supported therein, operating levers pivoted to the frame, uprights carried by the scoop, rollers carried thereby, tracks on which said rollers may run, and means for simultaneously applying force to both the operating levers and the uprights to cause the rollers to move along the tracks and dump the scoop.

4. A road grader comprising a wheeled frame, a scoop pivotally supported therein, operating levers pivoted to the frame and connected to one end of the scoop, uprights carried by the other end of the scoop, rollers supported by said uprights, tracks on which the rollers may run, and a cable for applying force to the operating levers and the uprights to cause the rollers to move along the track and dump the scoop.

5. A road grader comprising a wheeled frame, a scoop pivotally supported by said frame, rollers connected to the scoop, tracks on the frame, and means acting simultaneously upon both ends of said scoop for causing the rollers to traverse the tracks and thereby dump the scoop.

6. A road grader comprising a wheeled frame, a scoop pivotally supported therein, rollers connected to the scoop, tracks on the frame, operating levers also connected to the scoop, and means for applying force to both the rollers and the operating levers to cause the rollers to traverse the track and dump the scoop.

7. A road grader comprising a wheeled frame, a scoop pivotally supported therein, rollers connected to the scoop, tracks on the frame, operating levers also connected to the scoop and supporting a pulley at their upper end, and a cable passing around the pulley and connected at one end to the roller supporting means for simultaneously applying force to both the rollers and the operating levers to cause the rollers to traverse the track and thereby dump the scoop.

8. A road grader comprising a wheeled frame adapted to be connected to a tractor, a scoop pivotally connected to the wheeled frame, a winding drum on the tractor, a source of power, connections between the source and the drum, a clutch in said connections, a cable connected to the scoop to dump the same when it is wound on the drum, and means for automatically disconnecting said clutch.

9. A road grader comprising a wheeled frame adapted to be connected to a tractor, a scoop pivotally mounted in the wheeled frame, a winding drum on the tractor, a source of power, connections between the source and the drum, a clutch in said connections, a cable connected to the scoop to dump the same when it is wound on the drum, a brake for the drum, and means for disconnecting the clutch and applying the brake.

10. A road grader comprising a wheeled frame adapted to be connected to a tractor, a scoop pivotally mounted in the wheeled frame, a winding drum on the tractor, a source of power, connections between the source and the drum, a clutch in said connections, a cable connected to the scoop to dump the same when it is wound on the drum, means for disconnecting the clutch as desired, and means for automatically operating said disconnecting means when the scoop has reached the limit of its dumping movement.

11. A road grader comprising a wheeled frame adapted to be connected to a tractor, a scoop pivotally mounted in the wheeled frame, a winding drum on the tractor, a source of power, connections between the source and the drum, a clutch in said connections, a cable connected to the scoop to dump the same when it is wound on the drum, a brake for the drum, means for disconnecting the clutch and applying said brake, and means for automatically operating said disconnecting means when the scoop has reached the limit of its dumping movement.

12. A road grader comprising a wheeled frame, a scoop pivotally connected to said frame, rollers connected to the scoop, tracks on the frame, and means simultaneously applying power to both ends of the scoop to turn it about its pivotal point and cause the rollers to traverse the track, thereby dumping said scoop.

13. A road grader comprising a wheeled frame, a scoop pivotally connected to said frame, rollers connected to the scoop, tracks on the frame, a cable, and means whereby the cable may apply both to both ends of the scoop to cause the rollers to traverse the track as the scoop turns about its pivotal point to dumping position.

In testimony whereof we affix our signatures.

RHINEHARD BOLLHEIMER.
EDWARD T. WILKENS.